US012340725B2

(12) United States Patent
Wang et al.

(10) Patent No.: US 12,340,725 B2
(45) Date of Patent: Jun. 24, 2025

(54) DISPLAY METHOD, DISPLAY APPARATUS, AND COMPUTER-READABLE STORAGE MEDIUM

(71) Applicant: BOE Technology Group Co., Ltd., Beijing (CN)

(72) Inventors: Yu Wang, Beijing (CN); Yicheng Lin, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 9 days.

(21) Appl. No.: 17/912,037

(22) PCT Filed: Nov. 11, 2021

(86) PCT No.: PCT/CN2021/129975
§ 371 (c)(1),
(2) Date: Sep. 15, 2022

(87) PCT Pub. No.: WO2022/193688
PCT Pub. Date: Sep. 22, 2022

(65) Prior Publication Data

US 2024/0212558 A1 Jun. 27, 2024

(30) Foreign Application Priority Data

Mar. 18, 2021 (CN) ......................... 202110292898.4

(51) Int. Cl.
*G09G 3/20* (2006.01)

(52) U.S. Cl.
CPC ... *G09G 3/2074* (2013.01); *G09G 2320/0233* (2013.01); *G09G 2320/0257* (2013.01); *G09G 2360/148* (2013.01); *G09G 2360/16* (2013.01)

(58) Field of Classification Search
CPC .................................................... G09G 3/2074
See application file for complete search history.

(56) References Cited

U.S. PATENT DOCUMENTS

2002/0011978 A1 1/2002 Yamazaki et al.
2007/0097333 A1* 5/2007 Zavarehi .......... H04N 21/42202 348/E5.12

(Continued)

FOREIGN PATENT DOCUMENTS

CN 104809986 A 7/2015
CN 106251807 A 12/2016

(Continued)

OTHER PUBLICATIONS

International Search Report for PCT/CN2021/129975 Mailed Jan. 27, 2022.

(Continued)

*Primary Examiner* — William Boddie
*Assistant Examiner* — Andrew B Schnirel
(74) *Attorney, Agent, or Firm* — Ling Wu; Stephen Yang; Ling and Yang Intellectual Property

(57) ABSTRACT

A display method, including: determining a gray tone compensation parameter of a target sub-pixel in at least one sub-display area of a display area by at least one photosensitive device arranged in the display area; determining a gray tone voltage of a target sub-pixel in a display stage by using the gray tone compensation parameter of the target sub-pixel and a gray tone value to be output in the display stage; and determining a gray tone voltage of the remaining sub-pixels in the sub-display area in the display stage according to the gray tone voltage of the target sub-pixel in the display stage.

14 Claims, 9 Drawing Sheets

(56) References Cited

U.S. PATENT DOCUMENTS

| | | | | |
|---|---|---|---|---|
| 2008/0055210 | A1* | 3/2008 | Cok | G09G 3/006 345/77 |
| 2009/0058772 | A1 | 3/2009 | Lee | |
| 2014/0240375 | A1* | 8/2014 | Ha | G09G 3/32 345/82 |
| 2017/0025081 | A1 | 1/2017 | Satoh | |
| 2017/0169767 | A1 | 6/2017 | Song | |
| 2018/0322834 | A1 | 11/2018 | Zhang | |
| 2018/0357954 | A1* | 12/2018 | Lynch | G09G 3/3208 |
| 2019/0213955 | A1 | 7/2019 | Chen et al. | |
| 2020/0302868 | A1 | 9/2020 | Kim | |
| 2021/0225272 | A1 | 7/2021 | Yang et al. | |

FOREIGN PATENT DOCUMENTS

| | | | | |
|---|---|---|---|---|
| CN | 106910483 | A | 6/2017 | |
| CN | 108076335 | A | 5/2018 | |
| CN | 109599060 | A | 4/2019 | |
| CN | 109616049 | A | 4/2019 | |
| CN | 111292701 | A | 6/2020 | |
| CN | 111724739 | A | 9/2020 | |
| CN | 112071263 | A | 12/2020 | |
| CN | 112509514 | A | 3/2021 | |
| CN | 113053308 | A | 6/2021 | |
| JP | H10-105108 | A | 4/1998 | |
| JP | 2013-61446 | A | 4/2013 | |
| JP | 2015-95101 | A | 5/2015 | |
| JP | 2017-26899 | A | 2/2017 | |
| JP | 2018-131306 | A | 8/2018 | |
| KR | 10-2020-0111324 | A | 9/2020 | |
| WO | WO-2019201220 | A1 * | 10/2019 | G09G 3/2003 |

OTHER PUBLICATIONS

Office Action dated Nov. 22, 2021 for Chinese Patent Application No. 202110292898.4 and English Translation.

Decision to Grant dated Apr. 8, 2022 for Chinese Patent Application No. 202110292898.4 and English Translation.

* cited by examiner

DISPLAY METHOD, DISPLAY APPARATUS, AND COMPUTER-READABLE STORAGE MEDIUM

CROSS-REFERENCE TO RELATED APPLICATIONS

The present application is a U.S. National Phase Entry of International PCT Application No. PCT/CN2021/129975, having an international filing date of Nov. 11, 2021, which claims priority to Chinese Patent Application No. 202110292898.4 filed to the CNIPA on Mar. 18, 2021 and entitled "Display Method, Display Apparatus and Computer Readable Storage Medium", and the contents disclosed in the above-mentioned application are hereby incorporated as a part of this application.

TECHNICAL FIELD

The present disclosure relates to, but is not limited to, the field of display technology, especially a display method, a display apparatus, and a computer-readable storage medium.

BACKGROUND

As a kind of current-mode light emitting apparatuses, electroluminescent elements have been more and more used in display panels. Because of its self-luminescence characteristics, electroluminescent display panel does not need backlight, and has the advantages of high contrast, thin thickness, wide viewing angle, fast reaction speed, flexibility, simple structure and manufacturing process, etc. Therefore, electroluminescent display panel has gradually become the next generation mainstream display panel. Generally speaking, the pixel circuit of an electroluminescent display panel includes a Thin Film Transistor (TFT) and a storage capacitance. The TFT is controlled by a fixed scan waveform, and the voltage corresponding to the display data is charged to the storage capacitance. The display unit (for example, an Organic Light-Emitting Diode (OLED) device) is controlled by the voltage, and the luminous brightness of the display unit is adjusted.

SUMMARY

The following is a summary of subject matters described herein in detail. The summary is not intended to limit the protection scope of claims.

An implementation of the present disclosure provides a display method, a display device, and a computer-readable storage medium.

In a first aspect, an implementation of the present disclosure provides a display method, including: determining a gray tone compensation parameter of a target sub-pixel in at least one sub-display area of a display area by at least one photosensitive device arranged in the display area; determining a gray tone voltage of a target sub-pixel in a display stage by using the gray tone compensation parameter of the target sub-pixel and a gray tone value to be output in the display stage; and determining gray tone voltages of the remaining sub-pixels in the sub-display area in the display stage according to the gray tone voltage of the target sub-pixel in the display stage.

In some exemplary implementations, gray tone compensation parameters include a light start-up voltage of the target sub-pixel and a voltage at which the target sub-pixel reaches an ideal brightness for displaying the target gray tone value. The determining of a gray tone voltage of a target sub-pixel in a display stage by using the gray tone compensation parameter of the target sub-pixel and a gray tone value to be output in the display stage, includes: determining the gray tone voltage of the target sub-pixel in the display stage according to the following formula:

$$GL' = (Vt1 - Vt)\left(\frac{GL2}{GL1}\right)^{1.1} + Vt;$$

wherein, Vt is a illumination start-up voltage of the target sub-pixel, Vt1 is a voltage at which the target sub-pixel reaches the ideal brightness of displaying the target gray tone value GL1, and GL2 is a gray tone value to be output by the target sub-pixel in the display stage.

In some exemplary implementations, the determining of gray tone voltages of the remaining sub-pixels in the sub-display area in the display stage according to the gray tone voltage of the target sub-pixel in the display stage, includes: determining the gray tone voltages of the remaining sub-pixels of the adjacent sub-display area in the display stage by linear interpolation according to a gray tone voltage of a target sub-pixel in an adjacent sub-display area in the display stage.

In some exemplary implementations, the determining of the gray tone voltages of the remaining sub-pixels of the adjacent sub-display area in the display stage by linear interpolation according to a gray tone voltage of a target sub-pixel in an adjacent sub-display area in the display stage, includes: according to the gray tone voltage of the target sub-pixel of the adjacent sub-display area in the display stage, performing linear interpolation along the first direction and the second direction respectively to determine the gray tone voltages of the remaining sub-pixels of the adjacent sub-display area in the display stage, wherein the first direction crosses the second direction.

In some exemplary implementations, a target sub-pixel within the sub-display area is located at a center position of the sub-display area.

In some exemplary implementations, the target sub-pixels in the sub-display area include: a first target sub-pixel and a second target sub-pixel. after acquiring gray tone compensation parameter of the target sub-pixel in at least one sub-display area of the display area, the display method further includes: comparing gray tone compensation parameter of a first target sub-pixel in the sub-display area with gray tone compensation parameter of a first target sub-pixel in an adjacent sub-display area for at least one sub-display area to obtain a first comparison result; determining whether an abnormality exists in a first target sub-pixel in the sub-display area according to the first comparison result; when the first target sub-pixel in the sub-display area is abnormal, determining, according to a gray tone voltage of a second target sub-pixel in the sub-display area in the display stage, the gray tone voltages of the remaining sub-pixels in the sub-display area in the display stage.

In some exemplary implementations, a first target sub-pixel and a second target sub-pixel within the sub-display area are located at different angular positions of the sub-display area.

In some exemplary implementations, after acquiring gray tone compensation parameter of the target sub-pixel in at least one sub-display area of the display area, the display method further includes: for at least one sub-display area, determining whether the sub-display area has a first periphery area and the position of the first periphery area by using the gray tone compensation parameter of target sub-pixel in the sub-display area and the gray tone compensation parameter of the target sub-pixel in the adjacent sub-display area.

In some exemplary implementations, the target sub-pixels within the sub-display area include: a first target sub-pixel and at least one third target sub-pixel, the first target sub-pixel and the third target sub-pixel are located in different rows and different columns. For at least one sub-display area, the determining of whether the sub-display area has a first periphery area and the position of the first periphery area by using the gray tone compensation parameter of target sub-pixel in the sub-display area and the gray tone compensation parameter of the target sub-pixel in the adjacent sub-display area, includes: comparing gray tone compensation parameters of a first target sub-pixel in the sub-display area and a first target sub-pixel in an adjacent sub-display area for at least one sub-display area to obtain a second comparison result; determining whether a first periphery area exists in the sub-display area according to the second comparison result; when it is determined that a first periphery area exists in the sub-display area, comparing gray tone compensation parameters of a third target sub-pixel in the sub-display area with that of a first target sub-pixel in an adjacent sub-display area, and comparing gray tone compensation parameters of a third target sub-pixel in the sub-display area with that of a third target sub-pixel in an adjacent sub-display area to obtain a third comparison result, and determining a position of a first periphery area within the sub-display area according to the third comparison result.

In some exemplary implementations, the determining of gray tone voltages of the remaining sub-pixels in the sub-display area in the display stage according to the gray tone voltage of the target sub-pixel in the display stage, includes: for the first periphery area identified in the sub-display area, determining the gray tone voltages of the remaining sub-pixels in the first periphery area in the display stage by linear interpolation using the gray tone voltage of the target sub-pixel in the first periphery area in the display stage; for areas other than the first periphery area in the sub-display area, determining gray tone voltages of the remaining sub-pixels in the area other than the first periphery area in the display stage by linear interpolation using gray tone voltages of the target sub-pixels in the area other than the first periphery area in the display stage.

In some exemplary implementations, the at least one sub-display area is provided with multiple sub-pixels arranged in a 3*3 array or multiple sub-pixels arranged in a 4*4 array.

In some exemplary implementations, sub-pixels in the sub-display area correspond to photosensitive devices one to one.

In some exemplary implementations, the display method further includes: determining a theoretical brightness of the sub-display area based on gray tone values of multiple sub-pixels within the sub-display area; when multiple sub-pixels in the sub-display area display corresponding gray tone values, acquiring the sensed brightness of the sub-display area through a photosensitive device corresponding to a target sub-pixel in the sub-display area; determining whether the compensation condition is met through the theoretical brightness and the sensed brightness of the sub-display area; when the quantity of times that the compensation condition is satisfied is greater than the quantity threshold, an act of determining a gray tone compensation parameter of a target sub-pixel in at least one sub-display area of a display area by at least one photosensitive device arranged in the display area is performed.

In another aspect, an implementation of the present disclosure provides a display apparatus including multiple photosensitive devices and a processor. The multiple photosensitive devices are located in the display area of the display panel and are arranged corresponding to at least one sub-pixel in at least one sub-display area of the display area. The processor is connected with the multiple photosensitive devices and is configured to determine a gray tone compensation parameter of a target sub-pixel in the sub-display area through the photosensitive device in the sub-display area, determine a gray tone voltage of a target sub-pixel in a display stage by using the gray tone compensation parameter of the target sub-pixel of the sub-display area and a gray tone value to be output in the display stage; and determining gray tone voltages of the remaining sub-pixels in the sub-display area in the display stage according to the gray tone voltage of the target sub-pixel in the display stage.

In another aspect, an implementation of the present disclosure provides a computer-readable storage medium storing a computer program, wherein when the computer program is executed by a processor; the above display method are implemented.

Other aspects may be understood upon reading and understanding the drawings and the detailed description.

BRIEF DESCRIPTION OF DRAWINGS

Accompanying drawings are used for providing further understanding of technical solutions of the present disclosure, constitute a part of the specification, and together with the implementations of the present disclosure, are used for explaining the technical solutions of the present disclosure but not to constitute limitations on the technical solutions of the present disclosure. Shapes and sizes of one or more components in the drawings do not reflect true scales, and are only intended to schematically describe contents of the present disclosure.

DETAILED DESCRIPTION

Figure 1:
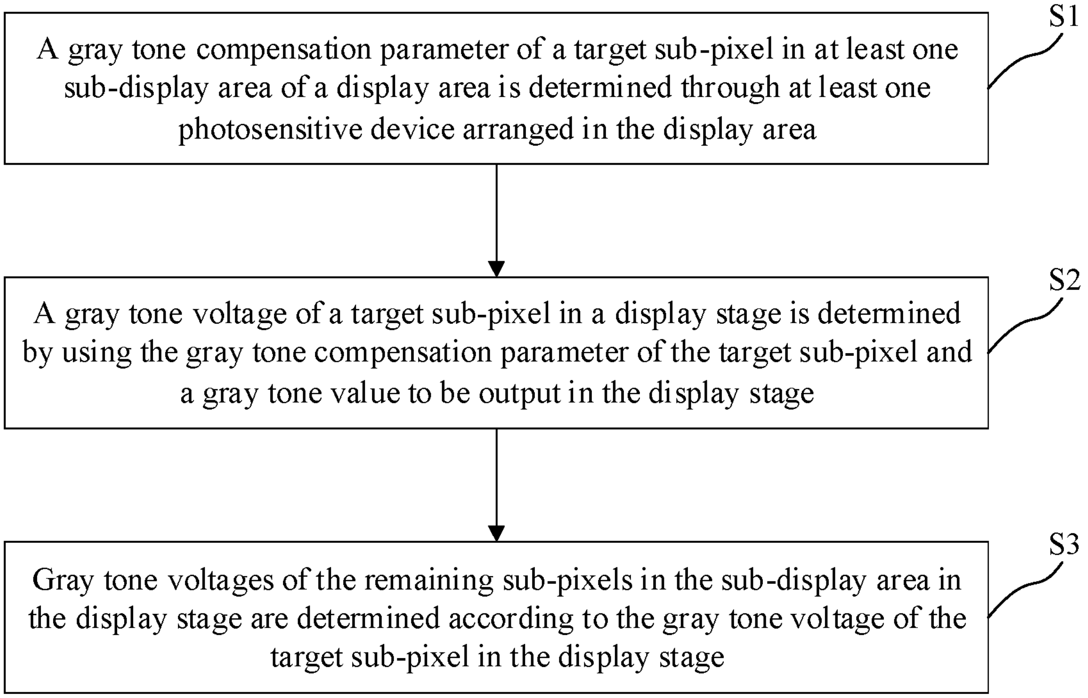
FIG. 1 is a schematic flowchart of a display method according to at least one implementation of the present disclosure.

Hereinafter implementations of the present disclosure will be described in detail with reference to the accompanying drawings. Implementation modes may be implemented in multiple different forms. Those of ordinary skills in the art may easily understand such a fact that implementation modes and contents may be transformed into one or more forms without departing from the purpose and scope of the present disclosure. Therefore, the present disclosure should not be explained as being limited to contents described in following implementation modes only. The implementations in the present disclosure and features in the implementations may be combined randomly with each other without conflict.

In the drawings, a size of one or more constituent elements, a thickness of a layer, or a region is sometimes exaggerated for clarity. Therefore, one implementation mode of the present disclosure is not necessarily limited to the sizes, and the shapes and sizes of multiple components in the accompanying drawings do not reflect actual scales. In addition, the drawings schematically illustrate ideal examples, and one implementation of the present disclosure is not limited to the shapes, numerical values, or the like shown in the drawings.

Ordinal numerals such as "first", "second" and "third" in the present disclosure are set to avoid confusion of constituents, but not intended for restriction in quantity. "Multiple/multiple" in the present disclosure means a quantity of two or more.

In the present disclosure, sometimes for convenience, wordings "central", "up", "down", "front", "back", "vertical", "horizontal", "top", "bottom", "inside", "outside" and the like indicating orientation or positional relationships are used to illustrate positional relationships between constituent elements with reference to the drawings. These terms are not intended to indicate or imply that involved devices or elements must have specific orientations and be structured and operated in the specific orientations but only to facilitate describing the present specification and simplify the description, and thus should not be understood as limitations on the present disclosure. The positional relationships between the constituent elements may be changed as appropriate based on the directions according to which the constituent elements are described. Therefore, appropriate replacements can be made according to situations without being limited to the wordings described in the specification.

In the present disclosure, unless otherwise specified and defined, terms "mounting", "mutual connection" and "connection" should be understood in a broad sense. For example, a connection may be a fixed connection, or a detachable connection, or an integrated connection. It may be a mechanical connection or an electrical connection. It may be a direct mutual connection, or an indirect connection through middleware, or internal communication between two components. Those of ordinary skills in the art may understand meanings of the above-mentioned terms in the present disclosure according to situations.

The process stability of transistor is the main factor affecting the display picture. There are differences in Threshold Voltage and Mobility of drive transistors among multiple sub-pixels, which lead to different currents supplied to each sub-pixel, resulting in brightness deviation, decrease in brightness uniformity of display panel, and even produce regional spots or patterns. On the other hand, display apparatuses (such as OLED apparatuses) will gradually age with the increase of service time, and cannot be recovered, and will age faster in areas lit for a long time, resulting in afterimage of the image picture. However, in view of the above problems, the current compensation methods cannot provide comprehensive and effective compensation, which leads to the uniformity of the display panel will begin to decline with the increase of service time, and may cause display problems such as afterimage.

FIG. 1 is a schematic flowchart of a display method according to at least one implementation of the present disclosure. As shown in FIG. 1, the display method of the present implementation includes the following acts S1 to S3.

S1, a gray tone compensation parameter of a target sub-pixel in at least one sub-display area of a display area is determined by at least one photosensitive device arranged in the display area;

S2, a gray tone voltage of a target sub-pixel in a display stage is determined by using the gray tone compensation parameter of the target sub-pixel and a gray tone value to be output in the display stage; and S3, gray tone voltages of the remaining sub-pixels in the sub-display area in the display stage are determined according to the gray tone voltage of the target sub-pixel in the display stage.

The display method of the implementation can compensate the brightness of the display panel, thereby improving the display uniformity of the display panel. Moreover, by sharing gray tone compensation parameters in the sub-display area, a better compensation effect can be achieved under the condition of using less data. In some examples, the display panel may be an OLED display panel. However, this implementation is not limited thereto.

In some exemplary implementations, the gray tone compensation parameters include a light start-up voltage of the target sub-pixel and a voltage at which the target sub-pixel reaches an ideal brightness for displaying the target gray tone value. In this example, the display effect of the sub-display area may be compensated by using the voltage data of the target sub-pixel at the ideal brightness, so that the display problem caused by the aging of the display apparatus in the display area can be improved, and the display effect of the display panel can be improved.

Figure 2:
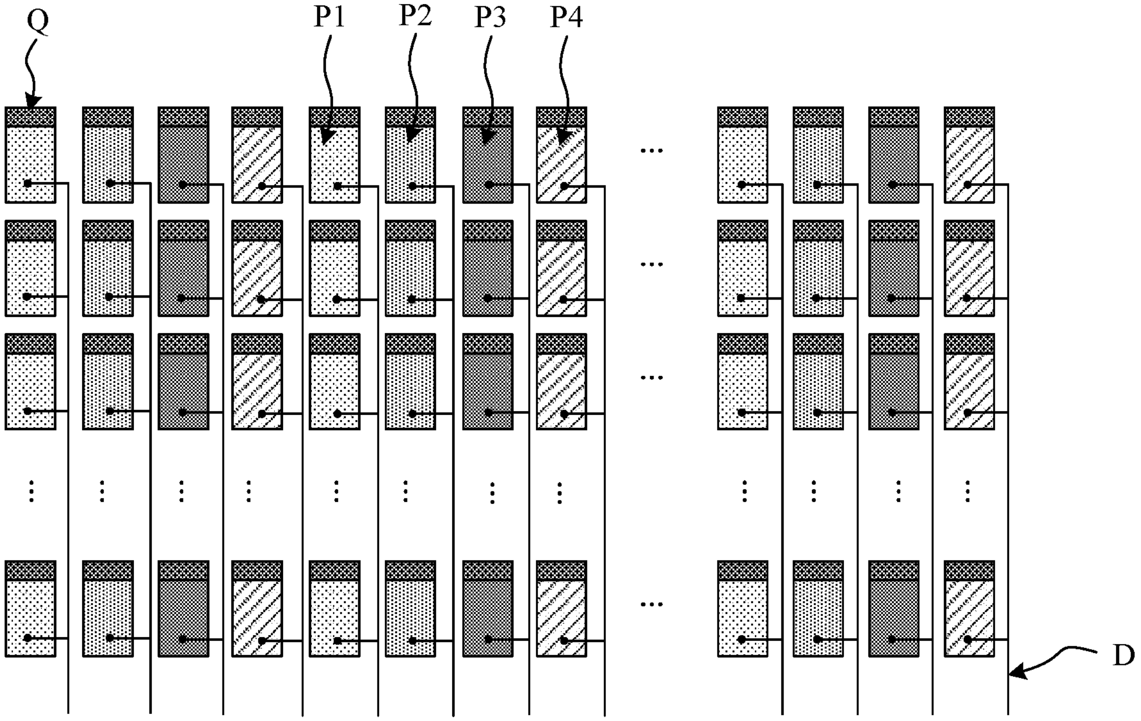
FIG. 2 is a schematic diagram of a structure of a display area of a display panel according to at least one implementation of the present disclosure.

FIG. 2 is a schematic diagram of a structure of a display area of a display panel according to at least one implementation of the present disclosure. As shown in FIG. 2, the display area may include: multiple pixel units and multiple photosensitive devices Q arranged in a matrix manner. At least one of the multiple pixel units includes a first light emitting unit P1 that emits light of the first color, a second light emitting unit P2 that emits light of the second color, a third light emitting unit P3 that emits light of the third color, and a fourth light emitting unit P4 that emits light of the fourth color. The first light emitting unit P1, the second light emitting unit P2, the third light emitting unit P3 and the fourth light emitting unit P4 each include a pixel driving circuit and a light emitting device. The pixel driving circuits in the first light emitting unit P1, the second light emitting unit P2, the third light emitting unit P3 and the fourth light emitting unit P4 are respectively connected to the scan signal line and the data signal line D. The pixel driving circuit is configured to receive a data voltage transmitted by the data signal line D and output a corresponding current to the light emitting device under the control of the scan signal line. The light emitting devices in the first light emitting unit P1, the second light emitting unit P2, the third light emitting unit P3, and the fourth light emitting unit P4 are connected to the pixel driving circuits of the corresponding light emitting units, respectively. A light emitting device in a light emitting unit is configured to, in response to a current output by a pixel circuit of the corresponding light emitting unit, emit light with a corresponding brightness.

In some exemplary implementations, the pixel unit may include a red (R) light emitting unit, a green (G) light emitting unit, a blue (B) light emitting unit, and a white light emitting unit, or may include a red light emitting unit, a green light emitting unit, and a blue light emitting unit. The present disclosure is not limited here. In some exemplary implementations, a shape of the light emitting units in the pixel unit may be a rectangle, a rhombus, a pentagon, or a hexagon. For example, when the pixel unit includes three light emitting units, the three light emitting units may be arranged in a manner to stand side by side horizontally, in a manner to stand side by side vertically, or in a Pyramid manner. When the pixel unit includes four light emitting units, the four light emitting units may be arranged in a manner to stand side by side horizontally, in a manner to stand side by side vertically, or in a manner to form a Square, which is not limited in the present disclosure.

In some exemplary implementations, multiple photosensitive devices Q may correspond to multiple light emitting units one to one. The photosensitive device Q may be located on one side of the light emitting unit, for example on the upper side of the light emitting unit. However, this implementation is not limited thereto. For example, the photosensitive device may be located on the lower side, left side or right side of the light emitting unit. In some examples, one photosensitive device may correspond to multiple light emitting units.

In some exemplary implementations, the photosensitive device may be a PIN type photodetector (also referred to as a PIN junction diode or a PIN diode). Since photosensitive devices are arranged around each light emitting unit, when the light emitting unit generates light with corresponding brightness according to the gray tone value, the illumination will be projected onto the photosensitive device. After the photosensitive device is illuminated, it will generate corresponding current through photoelectric conversion, and then the luminous brightness of the corresponding light emitting unit will be converted by the sensing circuit.

Figure 3:
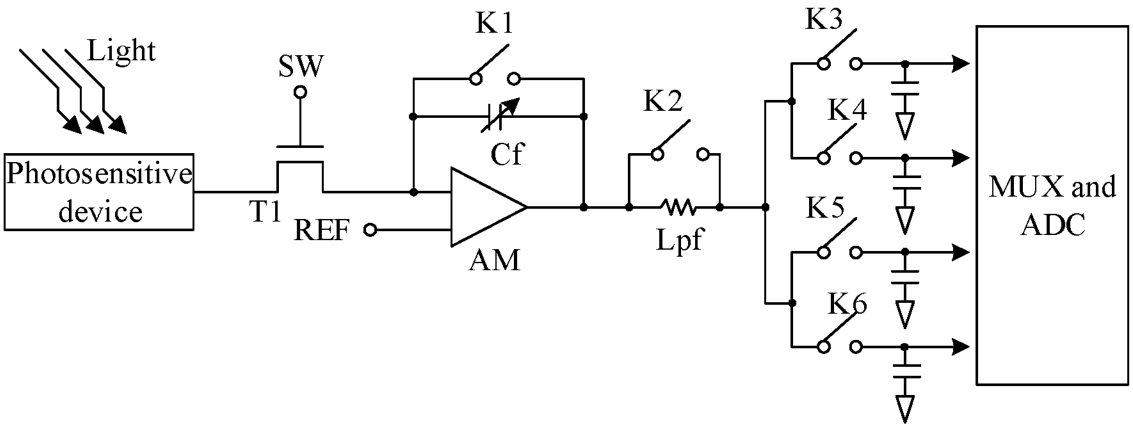
FIG. 3 is an exemplary diagram of a sensing circuit connected to a photosensitive device according to at least one implementation of the present disclosure.

FIG. 3 is an exemplary diagram of a sensing circuit connected to a photosensitive device according to at least one implementation of the present disclosure. As shown in FIG. 3, the sensing circuit may include a switch unit, a current integration unit a shunt unit a multiplexer (MUX) and an Analog-to-Digital Converter (ADC). The switch unit includes a transistor T1, the first electrode of which is connected to the output terminal of the photosensitive device, the second electrode of the first transistor T1 is connected to the first input terminal of the operational amplifier AM, and the control electrode of the transistor T1 is connected to the first signal terminal SW. The current integration unit includes an operational amplifier AM, a capacitance Cf, a first switch K1, a resistor Lpf, and a second switch K2. A second input terminal of the operational amplifier AM is connected to a second signal terminal REF. The first switch K1 and the capacitance Cf are connected in parallel between the first input terminal and the output terminal of the operational amplifier AM. The resistor Lpf and the second switch K2 are connected in parallel between the output terminal of the operational amplifier AM and the input terminal of the shunt unit. The shunt unit includes multiple switches (e.g. including a third switch K3, a fourth switch K4, a fifth switch K5, and a sixth switch K6) and multiple capacitances. One terminal of each switch is connected with an input terminal of the shunt unit, and the other terminal is connected with an output terminal of the shunt unit. One terminal of each capacitance is connected to one output terminal of the shunt unit, and the other terminal is grounded. Multiple output terminals of the shunt unit are connected to a multiplexer (MUX), which is connected to an Analog-to-Digital Converter (ADC). In some examples, a photosensitive device is arranged in the display area, a sensing circuit may be disposed in an external circuit board outside the display area, and the photosensitive device may be connected to the sensing circuit through traces. However, the present implementation does not limit the structure and arrangement position of the sensing circuit.

In some exemplary implementations, Step S1 may include determining a gray tone voltage of a target sub-pixel in a display stage according to the following formula:

$$GL' = (Vt1 - Vt)\left(\frac{GL2}{GL1}\right)^{1.1} + Vt;$$

wherein, Vt is a illumination start-up voltage of the target sub-pixel, Vt1 is a voltage at which the target sub-pixel reaches the ideal brightness of displaying the target gray tone value GL1, and GL2 is a gray tone value to be output by the target sub-pixel in the display stage.

In the present exemplary implementation, taking the display effect of the Gamma 2.2 curve as an example, the ideal brightness of the sub-pixel can be calculated using the following formula:

$$L = L_{max}(GL/1023)^{2.2};$$

wherein, L is the ideal brightness when the sub-pixel is displayed according to the gray tone value GL, and Lmax is the maximum brightness of the sub-pixel. However, this implementation is not limited thereto. For example, other Gamma curves can be used to calculate the ideal brightness.

In some exemplary implementations, in the sensing stage, sub-pixels are controlled to display at different gray tone voltages while the light emitting brightness of the sub-pixels is sensed by a photosensitive device corresponding to the sub-pixels. According to the ideal brightness calculation formula of sub-pixels, the ideal brightness of sub-pixels at the time of illumination start-up and the ideal brightness when displaying the target gray tone value can be determined. When the photosensitive device senses the ideal brightness of the light emitting brightness of the sub-pixel at the time of illumination start-up, the voltage at which the sub-pixel reaches the ideal brightness at the time of illumination start-up, that is, the illumination start-up voltage Vt, can be determined. When the photosensitive device senses an ideal voltage when the light emitting brightness of the sub-pixel reaches the target gray tone value, the voltage Vt1 at which the sub-pixel reaches the ideal brightness of the target gray tone value can be determined. In the display stage, the brightness compensation can be performed using the Vt and Vt1 obtained in the sensing stage. In some examples, the target gray tone value may be 127. However, this implementation is not limited thereto.

According to the transistor current formula, the following formula may be used to calculate the display brightness of sub-pixels:

$$L' = \eta * K(GL' - Vt_0)^2;$$

wherein, L' is the display brightness determined based on the transistor current, Vt0 is the illumination start-up voltage of the sub-pixel, η is a light emitting efficiency coefficient, GL' is a gray tone voltage corresponding to a gray tone value of the sub-pixel display, and K is a constant related to the process parameters and geometric dimensions of the transistor.

According to the above ideal brightness calculation formula of sub-pixels and the brightness calculation formula based on transistor current, the following formula may be obtained by combining the gray tone compensation parameters of sub-pixels:

$$\frac{\eta * K(GL' - Vt)^2}{\eta * K(Vt1 - Vt)^2} = \frac{L_{max}(GL2/1023)^{2.2}}{L_{max}(GL1/1023)^{2.2}};$$

after simplification, we can get:

$$GL' - Vt = (Vt1 - Vt)\left(\frac{GL2}{GL1}\right)^{1.1};$$

Finally, the following gray tone compensation formula may be obtained:

$$GL' = (Vt1 - Vt)\left(\frac{GL2}{GL1}\right)^{1.1} + Vt;$$

wherein, GL' is the gray tone voltage corresponding to the gray tone value GL2 to be displayed by the sub-pixel, Vt is the illumination start-up voltage of the sub-pixel, VT1 is the voltage at which the sub-pixel reaches the ideal brightness of the display target gray tone value GL1, and GL2 is the gray tone value to be displayed by the sub-pixel.

For example, when the target gray tone value GL1=127, the gray tone compensation calculation formula may be obtained as:

$$GL' = (Vt1 - Vt)\left(\frac{GL2}{127}\right)^{1.1} + Vt.$$

Since the illumination start-up voltage Vt of the sub-pixel and the voltage Vt1 of the sub-pixel reaching the ideal brightness of the display target gray tone value GL1 are both obtained by using the photosensitive device in the sensing stage, the target gray tone value GL1 is a fixed gray tone value adopted in the sensing stage, and the gray tone value GL2 to be displayed can be obtained according to the display data in the display stage. Therefore, according to the above known values, the compensated gray tone voltage can be determined by using the gray tone compensation calculation formula, so as to achieve the purpose of compensating and adjusting the Gamma display effect.

In some exemplary implementations, the sensing stage of obtaining the gray tone compensation parameters may be performed when the display apparatus is turned on or off in order to periodically improve the display effect of the display stage. Alternatively, the sensing stage may be performed during a non-display period after the display apparatus is turned on to support real-time improvement of the display effect. However, this implementation is not limited thereto.

In some exemplary implementations, act S2 may include: determining the gray tone voltages of the remaining sub-pixels of the adjacent sub-display area in the display stage by linear interpolation according to a gray tone voltage of a target sub-pixel in an adjacent sub-display area in the display stage.

In the present exemplary implementation, it is not necessary to calculate the compensated gray tone voltage for each sub-pixel using a gray tone compensation calculation formula, but the gray tone compensation parameters of the target sub-pixels are shared within the sub-display area, and then the compensated gray tone voltages of the remaining sub-pixels are determined by linear interpolation between adjacent target sub-pixels. In this way, the workload of the photosensitive device and the amount of data calculation can be reduced, thereby improving the processing efficiency.

Figure 4:
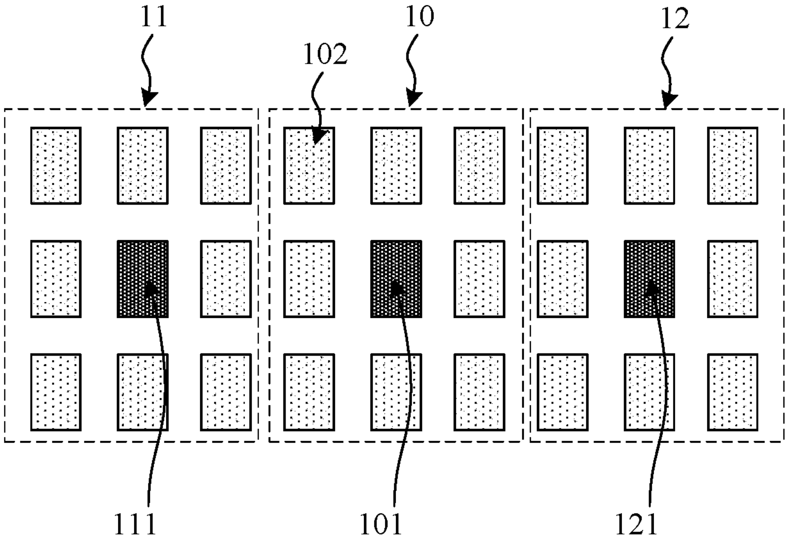
FIG. 4 is a schematic diagram of a sub-display area according to at least one implementation of the present disclosure.

FIG. 4 is a schematic diagram of a sub-display area according to at least one implementation of the present disclosure. Three adjacent sub-display areas (e.g. sub-display areas 10 11 and 12) are illustrated in FIG. 4 and the photosensitive devices within the sub-display areas are omitted. In some exemplary implementations, as shown in FIG. 4, each sub-display area is provided with 9 sub-pixels arranged in a 3*3 array and multiple photosensitive devices one-to-one corresponding to the multiple sub-pixels. In some examples, the photosensitive device may be located on one side of the corresponding sub-pixel. In this example, the sub-pixel at the center position of the sub-display area is taken as the target sub-pixel. For example, the target sub-pixel 101 within the sub-display area 10 is located at the center position of the sub-display area 10.

In some examples, the gray tone compensation parameters of the target sub-pixel can be determined by the photosensitive devices corresponding to the target sub-pixel, and the gray tone compensation calculation formula can be obtained by using the gray tone compensation parameters of the target sub-pixel. Then, by using the gray tone compensation formula and the gray tone value of the target sub-pixel in the display stage, the gray tone voltage of the target sub-pixel in the display stage can be calculated, and the gray tone voltage is the compensated gray tone voltage. After obtaining the gray tone voltage of the target sub-pixel in the display stage, the gray tone voltages of the remaining sub-pixels in the display stage can be determined by using the gray tone voltage of the target sub-pixel in the display stage. For example, in FIG. 4, gray tone voltages of a sub-pixel 102 on the right side of a target sub-pixel 101 in a sub-display area 10 and a sub-pixel on the left side of a target sub-pixel 121 in a sub-display area 12 at a display stage can be obtained by linearly interpolating gray tone voltages of a target sub-pixel 101 and a target sub-pixel 121 at a display stage. Gray tone voltages of a sub-pixel 102 on the left side of a target sub-pixel 101 in a sub-display area 10 and a sub-pixel on the right side of a target sub-pixel 111 in a sub-display area 11 can be obtained by linearly interpolating gray tone voltages of the target sub-pixel 111 and the target sub-pixel 101 in a display stage. Similarly, the gray tone voltage of the sub-pixel on the upper side of the target sub-pixel 101 in the display stage can be obtained by linearly interpolating the gray tone voltage of the target sub-pixel 101 and the target sub-pixel adjacent to the upper side of the target sub-pixel 101. Gray tone voltages of the sub-pixel at the upper left corner of the sub-display area 10 in the display stage can be obtained by linearly interpolating the gray tone voltage of the target sub-pixel 101 and the target sub-pixel adjacent in the diagonal direction in the display stage. Gray tone voltages of the sub-pixels at the lower side of the target sub-pixel 101, the upper right corner, the lower left corner, and the lower right corner of the sub-display area 10 in the display stage can also be obtained by linear interpolation with reference to a similar manner. However, this implementation is not limited thereto.

In some exemplary implementations, the determining of the gray tone voltages of the remaining sub-pixels of the adjacent sub-display area in the display stage by linear interpolation according to a gray tone voltage of a target sub-pixel in an adjacent sub-display area in the display stage, includes: according to the gray tone voltage of the target sub-pixel of the adjacent sub-display area in the display stage, performing linear interpolation along the first direction and the second direction respectively to determine the gray tone voltages of the remaining sub-pixels of the adjacent sub-display area in the display stage, wherein the first direction crosses the second direction. In some examples, the first direction is a sub-pixel row direction and the second direction is a sub-pixel column direction. Alternatively, the first direction is the sub-pixel column direction, and the second direction is the sub-pixel row direction. However, this implementation is not limited thereto.

Figure 5A:
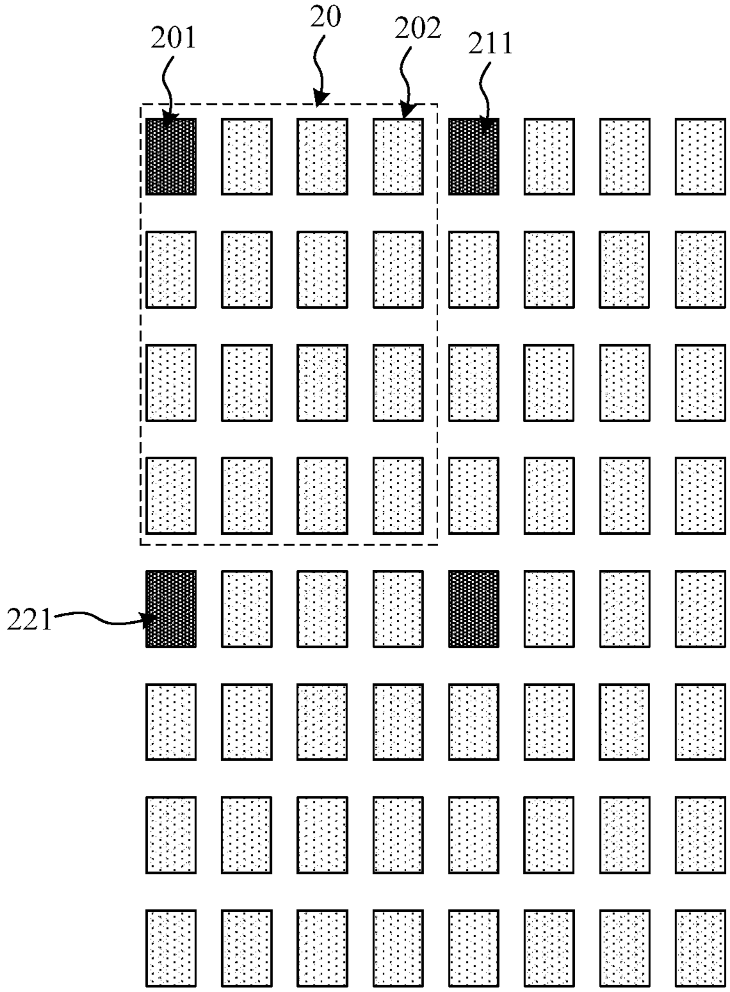
FIG. 5A is another schematic diagram of a sub-display area according to at least one implementation of the present disclosure.

FIG. 5A is another schematic diagram of a sub-display area according to at least one implementation of the present disclosure. In FIG. 5A, four adjacent sub-display areas (e.g. sub-display area 20 and three sub-display areas adjacent to sub-display area 20) are illustrated as an example, and the photosensitive devices within the sub-display areas are omitted. In some exemplary implementations, as shown in FIG. 5A, each sub-display area is provided with 16 sub-pixels arranged in a 4*4 array and multiple photosensitive devices one-to-one corresponding to the multiple sub-pixels. In some examples, the photosensitive device may be located on one side of the corresponding sub-pixel. In this example, the sub-pixel at the upper left corner of the sub-display area is taken as the target sub-pixel. For example, the target sub-pixel 201 within the sub-display area 20 is located at the upper left corner of the sub-display area 20. In some examples, in the sensing stage, the gray tone compensation parameters of the target sub-pixel can be determined by the photosensitive devices corresponding to the target sub-pixel, and the gray tone compensation calculation formula can be obtained by using the gray tone compensation parameters of the target sub-pixel. Then, in the display stage, by using the gray tone compensation formula and the gray tone value of the target sub-pixel in the display stage, the gray tone voltage of the target sub-pixel in the display stage can be calculated, and the gray tone voltage is the compensated gray tone voltage. After obtaining the gray tone voltage of the target sub-pixel in the display stage, the gray tone voltages of the remaining sub-pixels in the display stage can be determined by using the gray tone voltage of the target sub-pixel in the display stage.

Figure 5B:
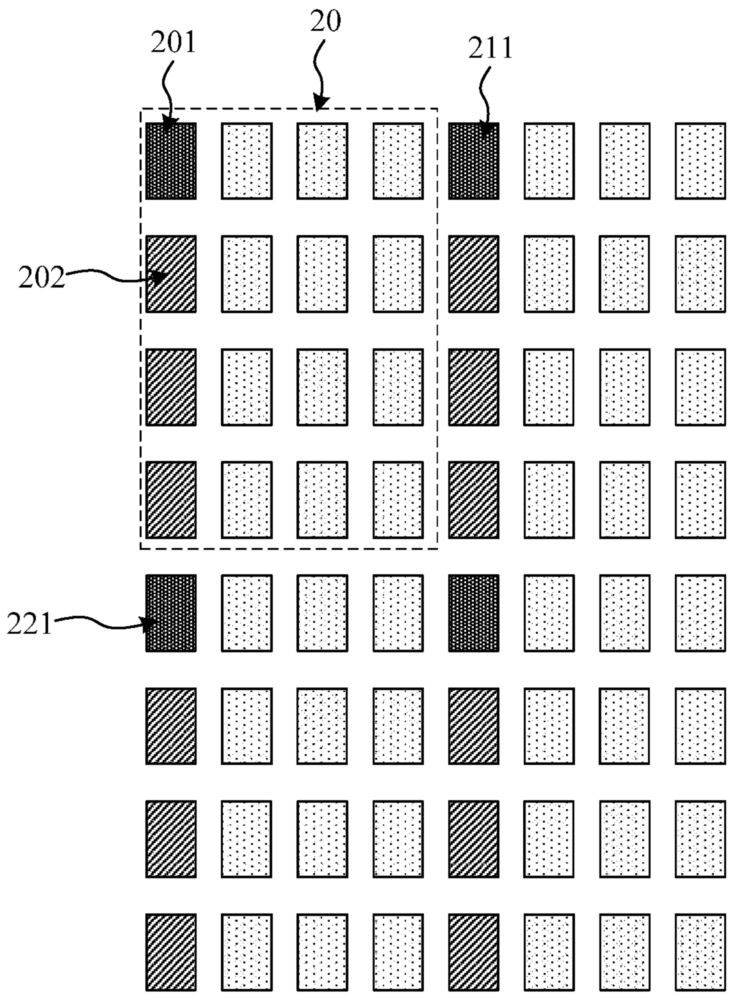
FIGS. 5B to 5D are schematic diagrams of linear interpolation sequences of sub-display areas according to at least one implementation of the present disclosure.
Figure 5C:
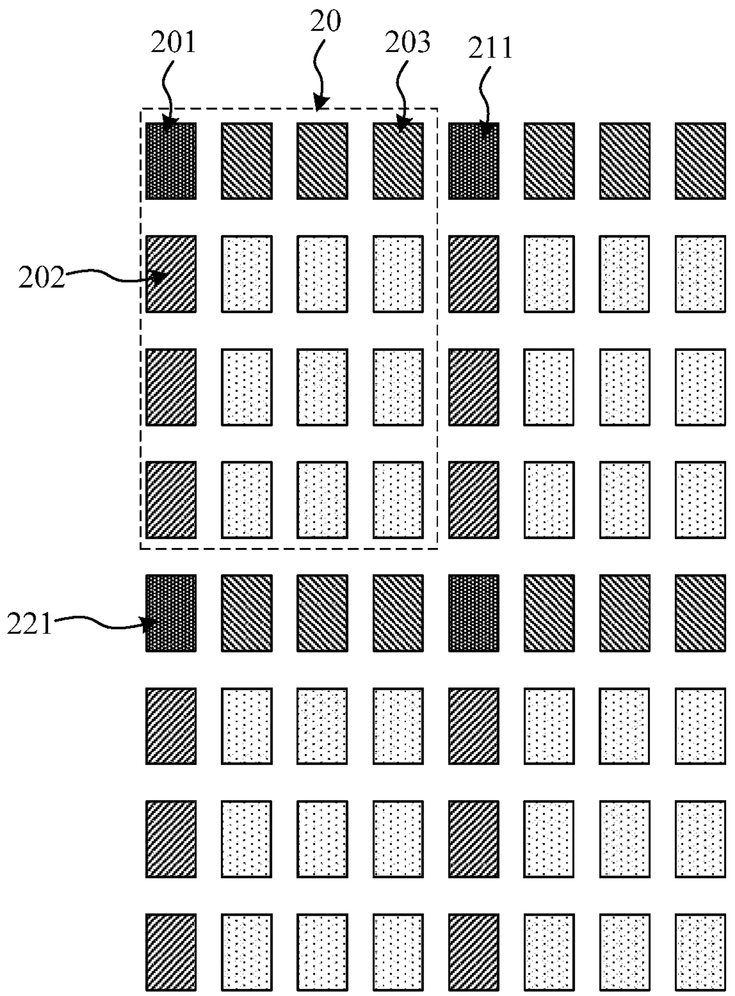
Figure 5D:
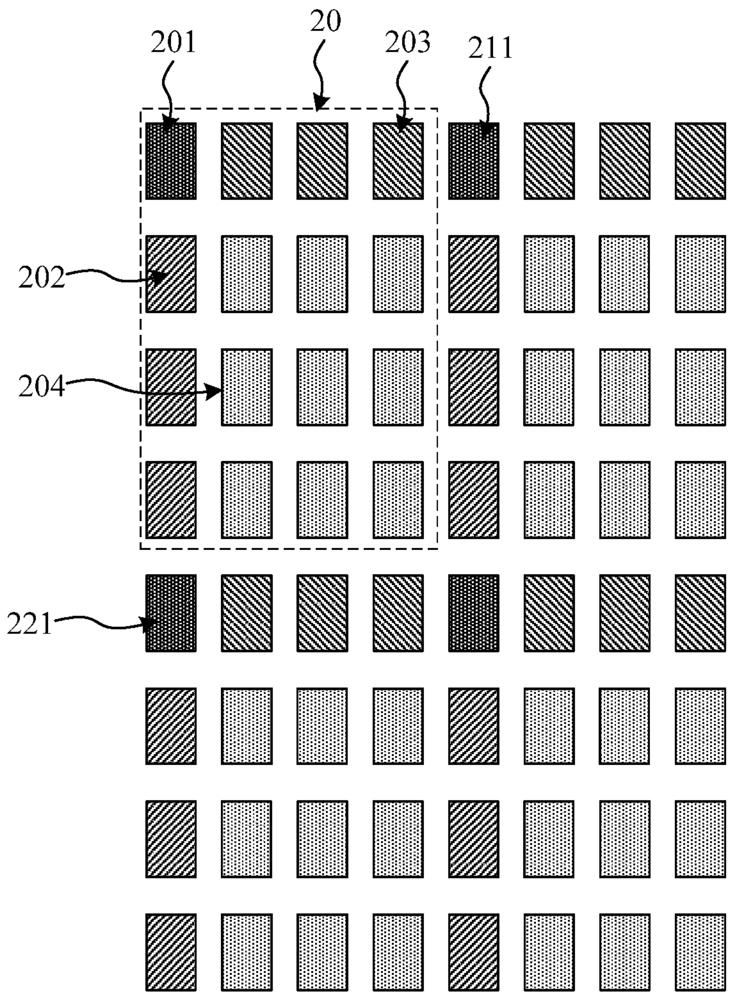

FIGS. 5B to 5D are schematic diagrams of linear interpolation sequences of sub-display areas according to at least one implementation of the present disclosure. The sub-display area 20 is described below as an example. After determining the gray tone voltage of the target sub-pixels (e.g. including the target sub-pixels 201, 211, 221) during the display stage, as shown in FIG. 5B, linear interpolation is performed with the gray tone voltages of the target sub-pixels 201 and 221 adjacent in the first direction (e.g. column direction) in the display stage to determine the gray tone voltages of the sub-pixels 202 between the target sub-pixels 201 and 221 in the display stage. Then, as shown in FIG. 5C, linear interpolation is performed with the gray tone voltages of the target sub-pixel 201 and the target sub-pixel 211 adjacent in the second direction (for example, the row direction) in the display stage to determine the gray tone voltages of the sub-pixel 203 between the target sub-pixels 201 and 211 in the display stage. Then, as shown in FIG. 5D, the gray tone voltages of the remaining sub-pixels 204 between the sub-pixels 202 in adjacent sub-display areas during the display stage may be determined by linearly interpolating gray tone voltages of sub-pixels 202 and determined sub-pixels in the adjacent sub-display areas along the second direction (eg, row direction) in the display stage. Alternatively, the gray tone voltages of the remaining sub-pixels 204 between the sub-pixels 203 in adjacent sub-display areas during the display stage may be determined by linearly interpolating gray tone voltages of sub-pixels 203 and determined sub-pixels in the adjacent sub-display areas along the first direction (eg, column direction) in the display stage. However, this implementation is not limited thereto. For example, linear interpolation may be performed first in the row direction as shown in FIG. 5C and then in the column direction as shown in FIG. 5B.

In some exemplary implementations, target sub-pixels in the sub-display area include: a first target sub-pixel and a second target sub-pixel. After determining a gray tone compensation parameter for a target sub-pixel within at least one sub-display area of the display area, the display method of the implementation further includes: comparing gray tone compensation parameter of a first target sub-pixel in the sub-display area with gray tone compensation parameter of a first target sub-pixel in an adjacent sub-display area for at least one sub-display area to obtain a first comparison result; determining whether an abnormality exists in a first target sub-pixel in the sub-display area according to the first comparison result; when the first target sub-pixel in the sub-display area is abnormal, determining, according to a gray tone voltage of a second target sub-pixel in the sub-display area in the display stage, the gray tone voltages of the remaining sub-pixels in the sub-display area in the display stage.

Figure 6:
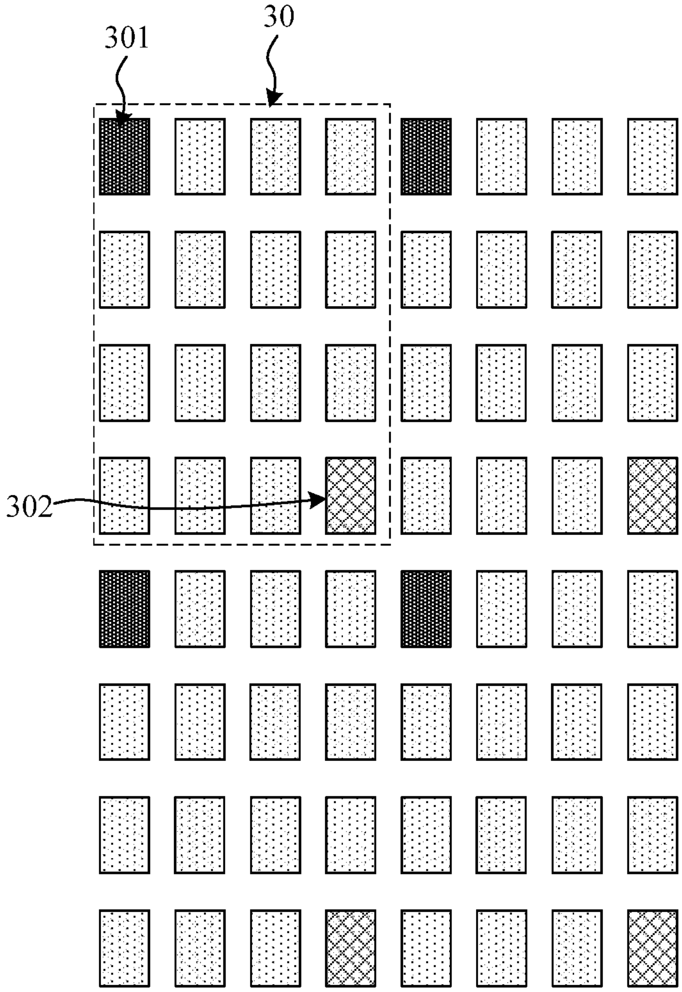
FIG. 6 is another schematic diagram of a sub-display area according to at least one implementation of the present disclosure.

FIG. 6 is another schematic diagram of a sub-display area according to at least one implementation of the present disclosure. In FIG. 6, four adjacent sub-display areas (e.g. sub-display area 30 and three sub-display areas adjacent to sub-display area 30) are illustrated as an example, and the photosensitive devices within the sub-display areas are omitted. In some exemplary implementations, as shown in FIG. 6, each sub-display area is provided with 16 sub-pixels arranged in a 4*4 array and multiple photosensitive devices one-to-one corresponding to the multiple sub-pixels. In some examples, the photosensitive device may be located on one side of the corresponding sub-pixel. In this example, a sub-pixel at the upper left corner of the sub-display area is used as a first target sub-pixel, and a sub-pixel at the lower right corner of the sub-display area is used as a second target sub-pixel. For example, a first target sub-pixel 301 within the sub-display area 30 is located at an upper left corner of the sub-display area 30 and a second target sub-pixel 302 is located at a lower right corner of the sub-display area 30. The first target sub-pixel 301 and the second target sub-pixel 302 are located at different angular positions of the sub-display area 30. However, this implementation is not limited thereto.

In some examples, the sub-display area 30 shown in FIG. 6 is explained as an example. In the sensing stage, the gray tone compensation parameter of the first target sub-pixel 301 is determined by the photosensitive device corresponding to the first target sub-pixel 301, and after the gray tone compensation parameter of the second target sub-pixel 302 is determined by the photosensitive device corresponding to the second target pixel 302, the gray tone compensation parameters of the first target sub-pixel 301 and the first target sub-pixel in the adjacent sub-display area are compared to obtain a first comparison result. When the first comparison result is that the absolute value of the difference between the gray tone compensation parameters of the first target sub-pixel 301 and at least one adjacent first target sub-pixel is greater than the abnormality recognition threshold, it is determined that the first target sub-pixel 301 has an abnormality. When the first comparison result is that the absolute value of the difference between the gray tone compensation parameters of the first target sub-pixel 301 and the first target sub-pixels adjacent on four sides is smaller than the abnormality recognition threshold value, it is determined that there is no abnormality in the first target sub-pixel 301. When it is determined that the first target sub-pixel 301 has an abnormality, the gray tone voltage of the second target sub-pixel 302 in the display stage is determined in the sub-display area 30, and the gray tone voltages of the remaining sub-pixels in the sub-display area 30 in the display stage is determined by using the gray tone voltage of the second target sub-pixel 302 in the display stage. The process of determining the gray tone voltages of the remaining sub-pixels in the sub-display area 30 in the display stage by using the gray tone voltages of the second target sub-pixels 302 in the display stage can be described with reference to the foregoing implementations, and therefore the above-mentioned process will not be repeated here.

In some examples, the gray tone compensation parameter employed in identifying whether the first target sub-pixel is abnormal is a voltage at which the target sub-pixel reaches an ideal brightness for displaying the target gray tone value. The voltage at which the first target sub-pixel 301 and the first target sub-pixel in the adjacent sub-display area reach the ideal brightness of the display target grays tone value can be compared, and the first comparison result can be obtained. For example, the voltages at which the first target sub-pixel 301 and the first target sub-pixels adjacent to the upper, lower, left, and right side reach the ideal brightness of the display target gray tone value may be compared respectively.

In some exemplary implementations, after determining a gray tone compensation parameter for a target sub-pixel within at least one sub-display area of the display area, the display method of the implementation further includes: for at least one sub-display area, determining whether the sub-display area has a first periphery area and the position of the first periphery area by using the gray tone compensation parameter of target sub-pixel in the sub-display area and the gray tone compensation parameter of the target sub-pixel in the adjacent sub-display area.

In some exemplary implementations, target sub-pixels within the sub-display area include: a first target sub-pixel and at least one third target sub-pixel, the first target sub-pixel and the third target sub-pixel are located in different rows and different columns. For at least one sub-display area, the determining of whether the sub-display area has a first periphery area and the position of the first periphery area by using the gray tone compensation parameter of target sub-pixel in the sub-display area and the gray tone compensation parameter of the target sub-pixel in the adjacent sub-display area, includes: comparing gray tone compensation parameters of a first target sub-pixel in the sub-display area and a first target sub-pixel in an adjacent sub-display area for at least one sub-display area to obtain a second comparison result; determining whether a first periphery area exists in the sub-display area according to the second comparison result; when it is determined that a first periphery area exists in the sub-display area, comparing gray tone compensation parameters of a third target sub-pixel in the sub-display area with that of a first target sub-pixel in an adjacent sub-display area, and comparing gray tone compensation parameters of a third target sub-pixel in the sub-display area with that of a third target sub-pixel in an adjacent sub-display area to obtain a third comparison result, and determining a position of a first periphery area within the sub-display area according to the third comparison result.

In some exemplary implementations, the determine of gray tone voltages of the remaining sub-pixels in the sub-display area in the display stage according to the gray tone voltage of the target sub-pixel in the display stage, includes: for the first periphery area identified in the sub-display area, determining the gray tone voltages of the remaining sub-pixels in the first periphery area in the display stage by linear interpolation using the gray tone voltage of the target sub-pixel in the first periphery area in the display stage; for areas other than the first periphery area in the sub-display area, determining gray tone voltages of the remaining sub-pixels in the area other than the first periphery area in the display stage by linear interpolation using gray tone voltages of the target sub-pixels in the area other than the first periphery area in the display stage.

In some examples, the first periphery area is an afterimage periphery area. Due to the aging of light emitting devices, the afterimage display problem may occur, and the gray tone voltage compensation for the gray tone compensation parameters shared by the sub-display areas may lead to the situation that the afterimage in the sub-display areas cannot be compensated, thus affecting the display effect. In the present exemplary implementation, by selecting multiple sub-pixels as target sub-pixels in a sub-display area, whether a first periphery area exists in the sub-display area and a position of the first periphery area are identified using gray tone compensation parameters of the multiple target sub-pixels. For the first periphery area, the gray tone compensation parameters of the target sub-pixels in the first periphery area are used to determine the compensated gray tone voltages of the remaining sub-pixels in the first periphery area. For an area other than the first periphery area, the gray tone compensation parameters of the target sub-pixels in the area are used to determine the compensated gray tone voltages of the remaining sub-pixels in the area. In this way, pertinent compensation can be performed in the first periphery area, thereby avoiding the situation that the afterimage cannot be compensated due to data sharing, thereby improving the display effect.

Figure 7:
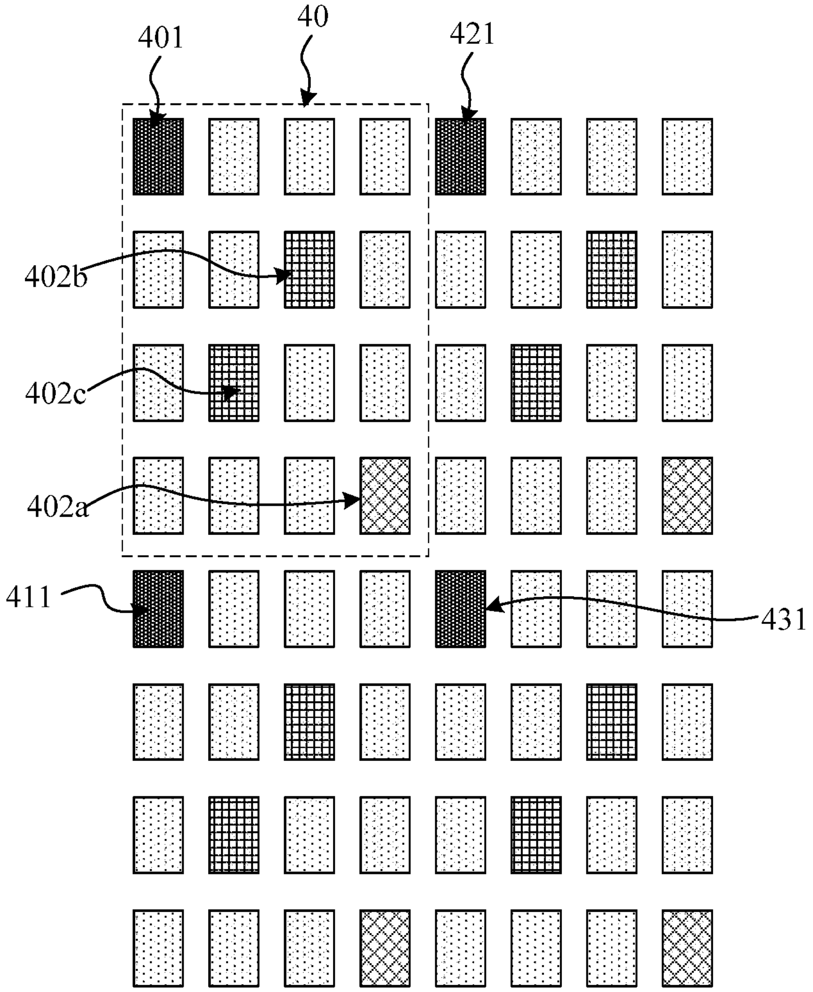
FIG. 7 is another schematic diagram of a sub-display area according to at least one implementation of the present disclosure.

FIG. 7 is another schematic diagram of a sub-display area according to at least one implementation of the present disclosure. In FIG. 7, four adjacent sub-display areas (e.g. sub-display area 40 and three sub-display areas adjacent to sub-display area 40) are illustrated as an example, and the photosensitive devices within the sub-display areas are omitted. In some exemplary implementations, as shown in FIG. 7, each sub-display area is provided with 16 sub-pixels arranged in a 4*4 array and multiple photosensitive devices one-to-one corresponding to the multiple sub-pixels. In some examples, the photosensitive device may be located on one side of the corresponding sub-pixel. In this example, a sub-pixel at the upper left corner of the sub-display area is taken as a first target sub-pixel. Multiple sub-pixels which are in different rows and columns from the first target sub-pixel and are in different rows and columns from each other are selected as third target sub-pixels. For example, a first target sub-pixel 401 within the sub-display area 40 is located at an upper left corner of the sub-display area 40 (i.e. in a first row and a first column). The third target sub-pixel 402*b* in the sub-display area 40 is located in the second row and third column, the third target sub-pixel 402*c* is located in the third row and second column, and the third target sub-pixel 402*a* is located in the fourth row and fourth column. However, this implementation is not limited thereto.

In some examples, the gray tone compensation parameter employed in identifying the first periphery area is a voltage at which the target sub-pixel reaches an ideal brightness for displaying the target gray tone value. After the gray tone compensation parameters of the first target sub-pixel and the third target sub-pixel are determined by the photosensitive device, the gray tone compensation parameters of the adjacent first target sub-pixel are used to determine whether a first periphery area exists in the sub-display area, and if the first periphery area exists, the type of the first periphery area is identified. Then, according to the identified type of the first periphery area, the position of the first periphery area is identified using the third target sub-pixel within the sub-display area and the first target sub-pixel and the third target sub-pixel of the adjacent sub-display area. Then, linear interpolation is performed on the identified first periphery area and the remaining areas within the sub-display area to determine the gray tone voltage of the sub-pixel in the display stage, respectively.

Figure 8:
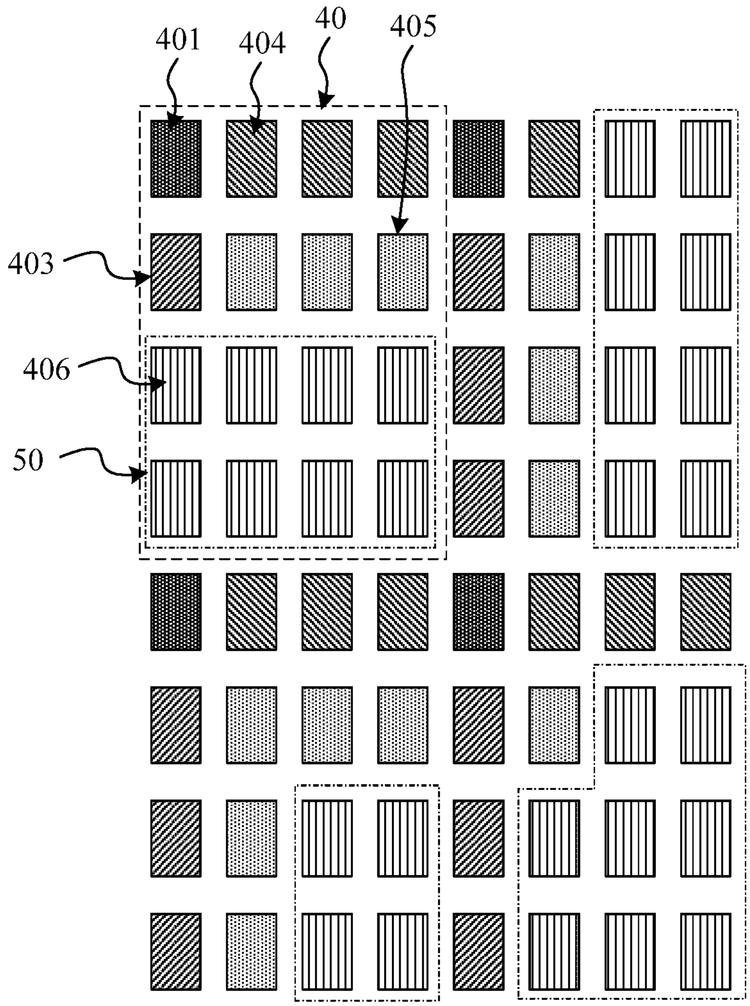
FIG. 8 is a schematic diagram of a first periphery area of a sub-display area according to at least one implementation of the present disclosure.

FIG. 8 is a schematic diagram of a first periphery area of a sub-display area according to at least one implementation of the present disclosure. With reference to FIGS. 7 and 8, the sub-display area 40 will be explained as an example. In some examples, after determining the gray tone compensation parameters of the first target sub-pixel and the third target sub-pixel, the gray tone compensation parameters of the first target sub-pixel 401 are compared with those of the first target sub-pixel within an adjacent sub-display area to obtain a second comparison result. In this example, the voltage at which the first target sub-pixel 401 and the first target sub-pixel in the adjacent sub-display area reach the ideal brightness of the display target grays tone value can be compared, and the second comparison result can be obtained. For example, the gray tone compensation parameters of the first target sub-pixel 401 may be compared with the first target sub-pixels adjacent to the upper, lower, left, right, upper left, lower right, upper right, and lower right sides respectively. When the second comparison result is that the absolute value of the difference between the gray tone compensation parameters of the first target sub-pixel 401 and at least one adjacent first target sub-pixel is greater than the periphery detection threshold and less than the abnormality recognition threshold, it is determined that a first periphery area exists in the sub-display area 40. When the second comparison result is that the absolute value of the difference between the gray tone compensation parameters of the first target sub-pixel 401 and the first target sub-pixel adjacent to the periphery is less than the periphery detection threshold value, it is determined that there is no first periphery area in the sub-display area 40. When it is determined that the sub-display area 40 has a first periphery area according to the second comparison result, the type of the first periphery area is identified according to the position of the first target sub-pixel and the first target sub-pixel 401 that satisfies the above-mentioned first periphery condition (i.e., the absolute value of the difference of gray tone compensation parameters of adjacent target sub-pixels is greater than the periphery detection threshold and less than the abnormality recognition threshold). For example, when a first periphery condition is satisfied between the first target sub-pixel 401 and the first target sub-pixel 411 adjacent to the lower side, the first periphery area is identified as a vertical periphery. When a first periphery condition is satisfied between the first target sub-pixel 401 and the first target sub-pixel 421 adjacent to the right side, a first periphery area is identified as a horizontal periphery. When a first periphery condition is satisfied between the first target sub-pixel 401 and the first target sub-pixel 431 adjacent to the lower right side, the first periphery area is identified as a corner area. As shown in FIG. 8, in the sub-display area 40 of the present example, a first periphery condition is satisfied between the first target sub-pixel 401 and the first target sub-pixel 411 adjacent to the lower side and a first periphery condition is satisfied between the first target sub-pixel 401 and the first target sub-pixel 431 adjacent to the lower right side are taken as examples. That is, a vertical periphery and a corner periphery exist in the sub-display area 40.

In some examples, after the recognition of the presence of vertical periphery and corner periphery in the sub-display area 40, gray tone compensation parameters of a third target sub-pixel within a sub-display area 40 may be compared with that of a first target sub-pixel of an adjacent sub-display area, and the gray tone compensation parameters of the third target sub-pixel in the sub-display area 40 may be compared with that of the third target sub-pixel in the adjacent sub-display area to obtain a third comparison result, and the positions of the vertical periphery and the corner periphery is determined according to the third comparison result. As shown in FIG. 7, a third comparison result indicates that a first periphery condition is not satisfied between the third target sub-pixel 402*c* and the first target sub-pixel 411, the first periphery condition is not satisfied between the third target sub-pixel 402*a* and the first target sub-pixel 411, and the first periphery condition is satisfied between the third target sub-pixel 402*b* and the first target sub-pixel 411, and it may be determined that the vertical periphery includes the third row and the fourth row of the sub-display area 40. A third comparison result indicates that a first periphery condition is not satisfied between the third target sub-pixel 402*a* and the first target sub-pixel 431, the first periphery condition is not satisfied between the third target sub-pixel 402*c* and the first target sub-pixel 431, and the first periphery condition is satisfied between the third target sub-pixel 402*b* and the first target sub-pixel 431, and it may be determined that the corner periphery is located in the lower right corner of the sub-display area 40, and the corner periphery includes the second to fourth columns and the third row and the fourth row of the sub-display area 40. Combining the vertical periphery and corner periphery, the first periphery area 50 within the sub-display area 40 includes the entire third and fourth rows of the sub-display area 40.

In some examples, as shown in FIGS. 7 and 8, for the first periphery area 50 within the sub-display area 40, the gray tone voltages of the remaining sub-pixels 406 within the first periphery area 50 in the display stage may be determined by linear interpolating the gray tone voltages of the third target sub-pixels 402*c* and 402*a* in the display stage. However, this implementation is not limited thereto. For example, When it is determined that a first periphery condition is not satisfied between the first periphery area 50 in the sub-display area 40 and the third target sub-pixel in the left adjacent sub-display area by comparing gray tone compensation parameters of a third target sub-pixel (e.g., third target sub-pixels 402*b* and 402*c*) within a first periphery area 50 of a sub-display area 40 and a third target sub-pixel within a left adjacent sub-display area, linear interpolation may be performed using a third target sub-pixel in the adjacent left sub-display area and a third target sub-pixel 402*a* or 402*c* in the sub-display area 40 to obtain gray tone voltages for the remaining sub-pixels in the first periphery area 50 during the display stage. As shown in FIGS. 7 and 8, the gray tone voltages of the sub-pixels 403 in the sub-display area 40 in the display stage can be obtained by linear interpolating the gray tone voltages of the first target sub-pixels 401 and the first adjacent target sub-pixels adjacent first target sub-pixel on the upper side at the display stage. The gray tone voltages of the sub-pixels 404 in the sub-display area 40 in the display stage may be linearly interpolated using the gray tone voltages of the first target sub-pixels 401 and 421 in the display stage. The gray tone voltages of the sub-pixels 405 in the sub-display area 40 in the display stage may be linearly interpolated using the gray tone voltages of the adjacent sub-pixels 403 in the display stage. However, this implementation is not limited thereto. The process of identifying and compensating the gray tone of the first periphery area of the remaining sub-display areas in FIG. 8 can be described with reference to the foregoing implementations and is therefore not described here.

The present exemplary implementation can achieve rapid identification and compensation of the first periphery area and can improve the compensation effect.

In some exemplary implementations, the display method further includes: determining a theoretical brightness of the sub-display area based on gray tone values of multiple sub-pixels within the sub-display area; when multiple sub-pixels in the sub-display area display corresponding gray tone values, acquiring the sensed brightness of the sub-display area through a photosensitive device corresponding to a target sub-pixel in the sub-display area; determining whether the compensation condition is met through the theoretical brightness and the sensed brightness of the sub-display area; when the quantity of times the compensation condition is satisfied is greater than the quantity threshold, an act of determining a gray tone compensation parameter of a target sub-pixel in at least one sub-display area of a display area by at least one photosensitive device arranged in the display area is performed.

In some examples, taking the sub-display area shown in FIG. 4 as an example, the theoretical brightness corresponding to 9 sub-pixels in the sub-display area in the real-time display stage can be calculated by using the ideal brightness calculation formula. In the real-time display stage, the sensed brightness of the sub-display area can be obtained through the photosensitive device corresponding to the target sub-pixel in the center of the sub-display area. The theoretical brightness and the sensed brightness are compared, and when the absolute value of the difference between the two is greater than or equal to a brightness threshold (e.g. 10% of the theoretical brightness), the quantity of times that the compensation condition is satisfied is increased by 1. Once the absolute value of the difference between them is less than the brightness threshold, the quantity of times satisfying the compensation condition is returned to zero. When the quantity of times that the compensation condition is satisfied is greater than the quantity threshold value (for example, 60 times), the above step S1 is performed when the display apparatus is turned off, so that steps S2 and S3 are performed when the display apparatus is turned on again to compensate the display brightness. However, this implementation is not limited thereto. In some examples, when the quantity of times that the compensation condition is satisfied is greater than the quantity threshold (e.g. 60 times), steps S1 to S3 may be performed when the display apparatus is returned on.

In the present exemplary implementation, the sensing and compensation calculation process is performed only when certain conditions are satisfied. However, this implementation is not limited thereto. For example, a gray tone compensation parameter can be determined by using a photosensitive device in a non-display period of the display apparatus, and a compensated gray tone voltage can be calculated by using the gray tone compensation parameter obtained in the non-display period in the display stage, so as to improve the display effect.

Figure 9:
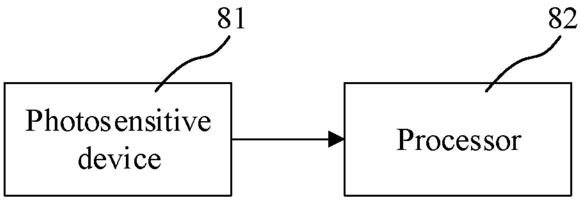
FIG. 9 is a schematic diagram of a display apparatus according to at least one implementation of the present disclosure.

FIG. 9 is a schematic diagram of a display apparatus according to at least one implementation of the present disclosure. As shown in FIG. 9, at least one implementation of the present disclosure further provides a display apparatus including multiple photosensitive devices 81 and a processor 82 connected to the multiple photosensitive devices. The multiple photosensitive devices 81 are located in a display area of the display panel and are disposed corresponding to at least one sub-pixel within at least one sub-display area of the display area. The processor 82 is configured to: determine gray tone compensation parameters of target sub-pixels in the sub-display area through the photosensitive device 81 in the sub-display area, determine gray tone voltage of the target sub-pixel in the display stage by using the gray tone compensation parameters of the target sub-pixel in the sub-display area and the gray tone value to be output in the display stage, and determine gray tone voltages of the remaining sub-pixels in the sub-display area in the display stage according to the gray tone voltage of the target sub-pixel in the display stage.

In some examples, the photosensitive device 81 may be disposed in a display area of the display panel, and the processor 82 may be disposed in a non-display area of the display panel. For example, the processor may supply the compensated gray tone voltage to a data driver on the display panel, so that the data driver generates a data voltage supplied to a data line that supplies the data voltage to a sub-pixel of the display area.

Regarding the implementation process of the display apparatus in this implementation, reference may be made to the descriptions of the previous implementations, and thus will not be repeated here.

In addition, at least one implementation of the present disclosure further provides a computer-readable storage medium storing a computer program, when the computer program is executed by a processor; the acts of the above display method are implemented.

Those of ordinary skills in the art may understand that all or some of the steps in the method, functional modules or units in the system and device disclosed above may be implemented as software, firmware, hardware, and an appropriate combination thereof. In a hardware implementation, a division between functional modules or units mentioned in the above description does not necessarily correspond to a division of physical components. For example, a physical component may have multiple functions, or a function or a step may be performed by several physical components in cooperation. Some certain components or all components may be implemented as software executed by a processor such as a digital signal processor or a microprocessor, or implemented as hardware, or implemented as an integrated circuit such as an application specific integrated circuit. Such software may be distributed in a computer-readable medium, and the computer-readable medium may include a computer storage medium (or a non-transitory medium) and a communication medium (or a transitory medium). As known to those of ordinary skill in the art, the term computer storage medium includes volatile and nonvolatile, and removable and irremovable media implemented in any method or technology for storing information (for example, a computer-readable instruction, a data structure, a program module, or other data). The computer storage medium includes, but is not limited to, RAM, ROM, EEPROM, a flash memory or another memory technology, CD-ROM, a digital versatile disk (DVD) or another optical disk storage, a magnetic cassette, a magnetic tape, a magnetic disk storage, or another magnetic storage apparatus, or any other medium that may be configured to store desired information and may be accessed by a computer. In addition, it is known to those of ordinary skill in the art that the communication medium usually includes a computer-readable instruction, a data structure, a program module, or other data in a modulated data signal of, such as, a carrier or another transmission mechanism, and may include any information delivery medium.

The above shows and describes basic principles, main features, and advantages of the present disclosure. The present disclosure is not limited by the above implementations. The above implementations and descriptions in the specification only illustrate the principles of the present disclosure. Without departing from the spirit and scope of the present disclosure, there will be many changes and improvements in the present disclosure, and all of these changes and improvements fall within the protection scope of the present disclosure.

The invention claimed is:

1. A display method, comprising:

determining a gray tone compensation parameter of a target sub-pixel in at least one sub-display area of a display area through at least one photosensitive device arranged in the display area;

determining a gray tone voltage of a target sub-pixel in a display stage by using the gray tone compensation parameter of the target sub-pixel and a gray tone value to be output in the display stage; and determining, according to the gray tone voltage of the target sub-pixel in the display stage, gray tone voltages of remaining sub-pixels in the sub-display area in the display stage, wherein the gray tone compensation parameter comprises: an illumination start-up voltage of the target sub-pixel and a voltage at which the target sub-pixel reaches an ideal brightness for displaying a target gray tone value;

determining the gray tone voltage of the target sub-pixel in the display stage by using the gray tone compensation parameter of the target sub-pixel and the gray tone value to be output in the display stage, comprises:

determining the gray tone voltage of the target sub-pixel in the display stage according to a following formula:

$$GL' = (Vt1 - Vt)\left(\frac{GL2}{GL1}\right)^{1.1} + Vt;$$

wherein Vt is the illumination start-up voltage of the target sub-pixel, Vt1 is the voltage at which the target sub-pixel reaches the ideal brightness of displaying the target gray tone value GL1, and GL2 is the gray tone value to be output by the target sub-pixel in the display stage.

2. The display method according to claim 1, wherein the determining gray tone voltages of the remaining sub-pixels in the sub-display area in the display stage according to the gray tone voltage of the target sub-pixel in the display stage, comprises:

determining, according to a gray tone voltage of a target sub-pixel in an adjacent sub-display area in the display stage, gray tone voltages of remaining sub-pixels of the adjacent sub-display area in the display stage by linear interpolation.

3. The display method according to claim 2, wherein the determining the gray tone voltages of the remaining sub-pixels of the adjacent sub-display area in the display stage by linear interpolation according to a gray tone voltage of a target sub-pixel in an adjacent sub-display area in the display stage, comprises:

according to the gray tone voltage of the target sub-pixel of the adjacent sub-display area in the display stage, performing linear interpolation in a first direction and a second direction respectively to determine the gray tone voltages of the remaining sub-pixels of the adjacent sub-display area in the display stage, wherein the first direction crosses the second direction.

4. The display method according to claim 2, wherein a target sub-pixel within the sub-display area is located at a center position of the sub-display area.

5. The display method according to claim 1, wherein target sub-pixels in the sub-display area comprise: a first target sub-pixel and a second target sub-pixel;

after acquiring the gray tone compensation parameter of the target sub-pixel in at least one sub-display area of the display area, the display method further comprises:

comparing a gray tone compensation parameter of a first target sub-pixel in the sub-display area with a gray tone compensation parameter of a first target sub-pixel in an adjacent sub-display area for at least one sub-display area to obtain a first comparison result;

determining, according to the first comparison result, whether an abnormality exists in a first target sub-pixel in the sub-display area;

when the first target sub-pixel in the sub-display area is abnormal, determining, according to a gray tone voltage of a second target sub-pixel in the sub-display area in the display stage, the gray tone voltages of the remaining sub-pixels in the sub-display area in the display stage.

6. The display method according to claim 5, wherein a first target sub-pixel and a second target sub-pixel within the sub-display area are located at different angular positions of the sub-display area.

7. The display method according to claim 1, wherein after acquiring the gray tone compensation parameter of the target sub-pixel in at least one sub-display area of the display area, the display method further comprises:

for at least one sub-display area, determining whether the sub-display area has a first periphery area and a position of the first periphery area by using the gray tone compensation parameter of the target sub-pixel in the sub-display area and the gray tone compensation parameter of the target sub-pixel in the adjacent sub-display area.

8. The display method according to claim 7, wherein target sub-pixels within the sub-display area comprise: a first target sub-pixel and at least one third target sub-pixel, the first target sub-pixel and the third target sub-pixel are located in different rows and different columns;

for at least one sub-display area, the determining whether the sub-display area has a first periphery area and the position of the first periphery area by using the gray tone compensation parameter of target sub-pixel in the sub-display area and the gray tone compensation parameter of the target sub-pixel in the adjacent sub-display area, comprises:

for at least one sub-display area, comparing a gray tone compensation parameter of a first target sub-pixel in the sub-display area with that of a first target sub-pixel in an adjacent sub-display area to obtain a second comparison result;

determining whether a first periphery area exists in the sub-display area according to the second comparison result;

when it is determined that a first periphery area exists in the sub-display area, comparing a gray tone compensation parameter of a third target sub-pixel in the sub-display area with that of a first target sub-pixel in an adjacent sub-display area, and comparing a gray tone compensation parameter of a third target sub-pixel in the sub-display area with that of a third target sub-pixel in an adjacent sub-display area to obtain a third comparison result, and determining a position of a first periphery area within the sub-display area according to the third comparison result.

9. The display method according to claim 8, wherein the determining gray tone voltages of the remaining sub-pixels in the sub-display area in the display stage according to the gray tone voltage of the target sub-pixel in the display stage, comprises:

for the first periphery area identified in the sub-display area, determining gray tone voltages of remaining sub-pixels in the first periphery area in the display stage by linear interpolation using the gray tone voltage of the target sub-pixel in the first periphery area in the display stage;

for areas other than the first periphery area in the sub-display area, determining gray tone voltages of remaining sub-pixels in areas other than the first periphery area in the display stage by linear interpolation using gray tone voltages of target sub-pixels in areas other than the first periphery area in the display stage.

10. The display method according to claim 1, wherein the at least one sub-display area is provided with a plurality of sub-pixels arranged in a 3*3 array or a plurality of sub-pixels arranged in a 4*4 array.

11. The display method according to claim 1, wherein sub-pixels in the sub-display area correspond to the photosensitive devices one by one.

12. The display method according to claim 1, further comprising: determining a theoretical brightness of the sub-display area according to gray tone values of a plurality of sub-pixels within the sub-display area;

when a plurality of sub-pixels in the sub-display area display corresponding gray tone values, acquiring a sensed brightness of the sub-display area through a photosensitive device corresponding to a target sub-pixel in the sub-display area;

determining whether a compensation condition is satisfied through the theoretical brightness and the sensed brightness of the sub-display area;

when a quantity of times that the compensation condition is satisfied is greater than a quantity threshold, an act of determining a gray tone compensation parameter of a target sub-pixel in at least one sub-display area of a display area by at least one photosensitive device arranged in the display area is performed.

13. A display apparatus, comprising:

a plurality of photosensitive devices located in a display area of a display panel and arranged corresponding to at least one sub-pixel in at least one sub-display area of the display area;

a processor connected to the plurality of photosensitive devices, and configured to determine a gray tone compensation parameter of a target sub-pixel in the sub-display area through the photosensitive device in the sub-display area, determine a gray tone voltage of a target sub-pixel in a display stage by using the gray tone compensation parameter of the target sub-pixel and a gray tone value to be output in the display stage; and determine gray tone voltages of remaining sub-pixels in the sub-display area in the display stage according to the gray tone voltage of the target sub-pixel in the display stage, wherein the gray tone compensation parameter comprises: an illumination start-up voltage of the target sub-pixel and a voltage at which the target sub-pixel reaches an ideal brightness for displaying a target gray tone value;

the processor is further configured to determine the gray tone voltage of the target sub-pixel in the display stage according to a following formula:

$$GL' = (Vt1 - Vt)\left(\frac{GL2}{GL1}\right)^{1.1} + Vt;$$

wherein Vt is the illumination start-up voltage of the target sub-pixel, Vt1 is the voltage at which the target sub-pixel reaches the ideal brightness of displaying the target gray tone value GL1, and GL2 is the gray tone value to be output by the target sub-pixel in the display stage.

14. A non-transitory computer-readable storage medium, storing a computer program, wherein when the computer program is executed by a processor, the above display method according to claim 1 is implemented.

* * * * *